United States Patent

[11] 3,607,502

[72] Inventors Alfred Marzocchi;
Albert J. Garbin, both of Cumberland, R.I.
[21] Appl. No. 828,033
[22] Filed Feb. 27, 1969
Division of Ser. No. 649,165, June 27, 1967, Pat. No. 3,473,400
[45] Patented Sept. 21, 1971
[73] Assignee Owens-Corning Fiberglas Corporation

[54] INDUSTRIAL BELT CONSTRUCTION AND METHOD OF MANUFACTURING SAME
6 Claims, 10 Drawing Figs.
[52] U.S. Cl. ................................................ 156/142, 156/137, 156/171, 156/173, 156/176, 156/193
[51] Int. Cl. ..................................................... B29h 7/22
[50] Field of Search .......................................... 156/137, 171, 173, 193, 142, 176

[56] References Cited
UNITED STATES PATENTS
2,272,883  2/1942  Haggan ........................ 156/142
3,252,278  5/1966  Marzocchi et al. ........... 156/308

Primary Examiner—Leland A. Sebastian
Assistant Examiner—Brooks H. Hunt
Attorneys—Staelin & Overman and Paul F. Stutz ABSTRACT: A method of industrial belt manufacture comprising the steps of wrapping a first layer of rubber about a core, winding a continuous length of reinforcement material about the layer, the length of reinforcement material bearing a coating which, on exposure to heat, expands to a cushionable sheath, wrapping another layer of rubberlike material about the assembly, dividing the assembly into a plurality of rings and heat curing the rings whereby the cushionable sheath is formed.

PATENTED SEP 21 1971
3,607,502
SHEET 1 OF 3
FIG. 1
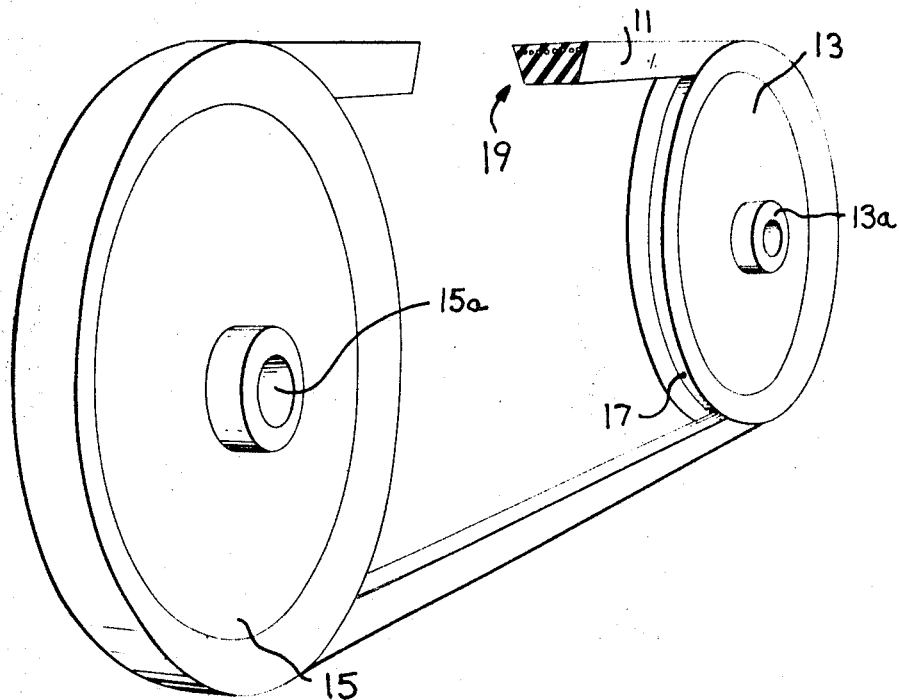
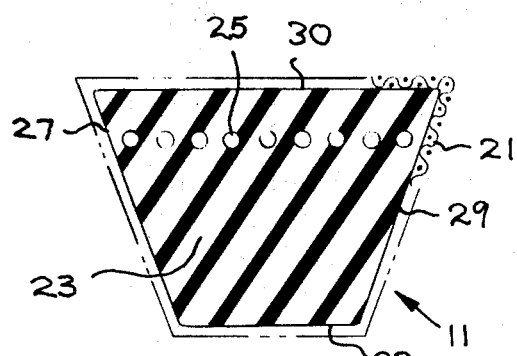
FIG. 2
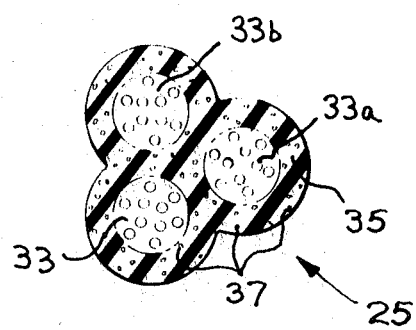
FIG. 3
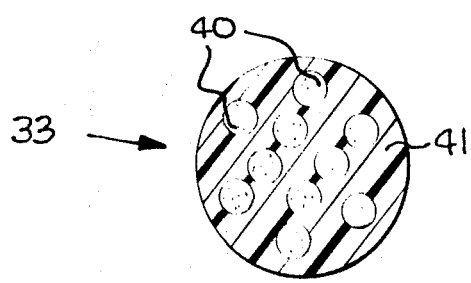
FIG. 4
INVENTORS
ALFRED MARZOCCHI
BY ALBERT J. GARBIN
*Staelin & Overman*
ATTORNEYS

INVENTORS
ALFRED MARZOCCHI
ALBERT J. GARBIN
BY
ATTORNEYS

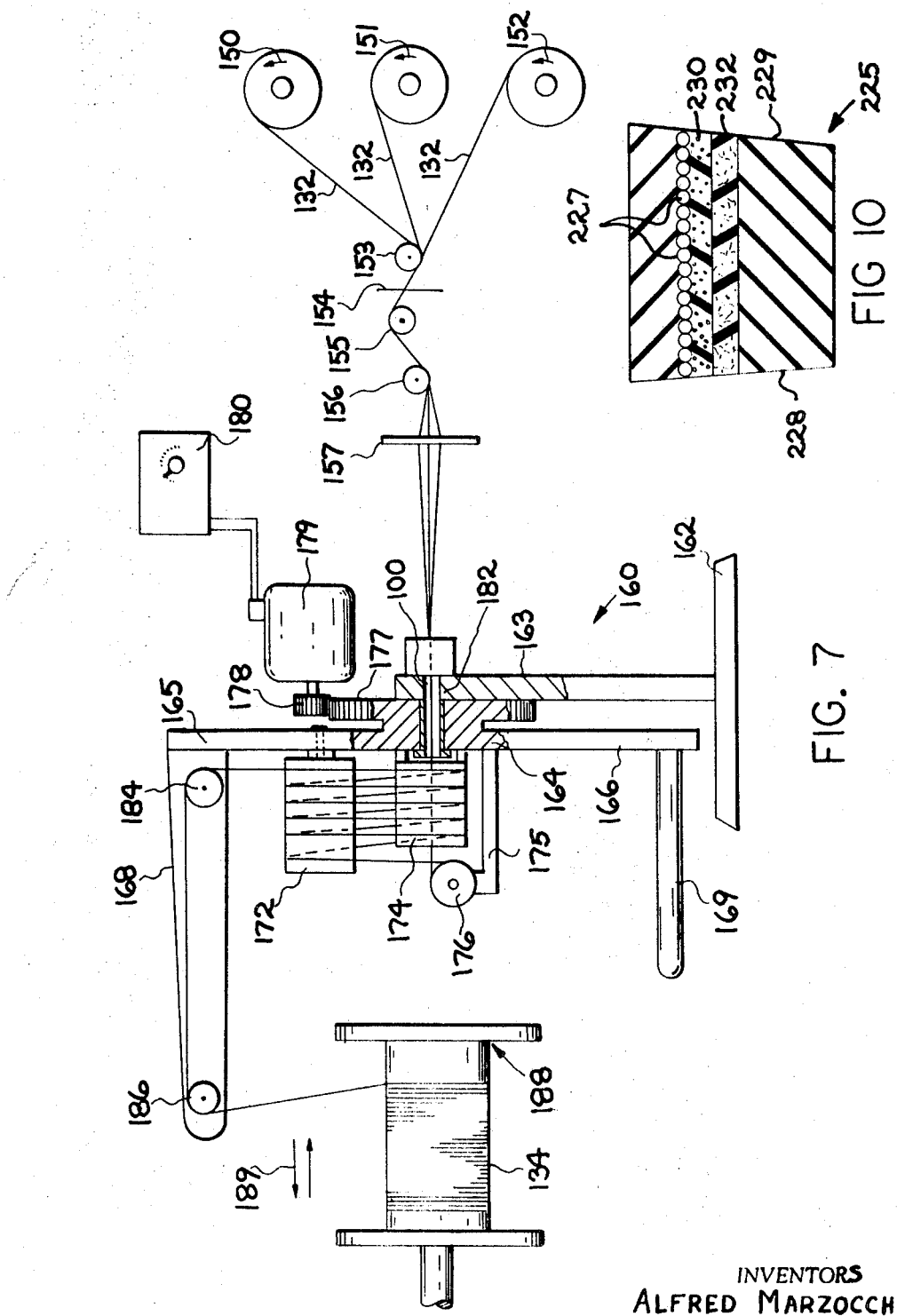

INDUSTRIAL BELT CONSTRUCTION AND METHOD OF MANUFACTURING SAME

This is a division of copending application Ser. No. 649,165, filed June 27, 1967, now U.S. Pat. No. 3,473,400 issued Oct. 21, 1969.

The present invention relates broadly to industrial belts and methods of manufacturing them.

The present invention is particularly concerned with a novel reinforcement for industrial drive belts. Drive belts, of which the V-belt is the most common example, are employed for transmitting rotary motion from a source of power, such as a motor or engine, to an auxiliary unit which performs some useful task. In the automobile, for example, the V-belt transmits rotation from the drive shaft of the internal combustion engine to the generator and to the water pump. The term "industrial belt," of course, includes drive belts, conveyor belts, timing belts, idler belts, etc. In the interest of simplicity, the disclosure will be confined to the V-belt which is of trapezoidal configuration in section. Most of the other belts are rectangular in section and of various dimensions depending on the application.

Industrial belts are formed of various types of rubber and even plastic compositions. Due to the stretchable properties of these materials, particularly under load conditions, it is important to employ an interior reinforcement to hold the elongation to within certain limits. Without the reinforcement, the belt would continue to elongate and ultimately the slack between the pulleys or sheaves would result in failure to transmit the rotation from the motor or engine.

A variety of textile materials have been employed as a reinforcement for these belts; for example, cotton, rayon, nylon, polyester and, as well, glass fiber. The reinforcement may take the form of a woven sheet fabric or it may take the form of a spiral cord wrap extending usually longitudinally of the belt.

The conventionally used organics, although improving the performance of belts as compared to unreinforced rubber, ultimately exhibit elongation under extended service conditions. This, of course, would be expected, however, due to the inherent susceptibility of organics to thermal and other atmospheric effects.

Glass in the form of gathered-together filaments forming strands, yarns and ultimately cords is a structure which has essentially 100 percent elasticity. Furthermore, it exhibits practically no yield under stress, possesses excellent dimensional stability, and immunity to changes due to atmospheric conditions. From this point of view, glass is seen as a desirable candidate for reinforcing.

It must be recognized, however, that fiber glass possesses a number of inherent properties or characteristics which are substantially different as compared to those possessed by the organic textile fibers conventionally used as a reinforcement for rubber. By way of example, the stiffness of glass is 322 grams per denier (g.p.d.); while the stiffness of nylon ranges from 18 to 23 g.p.d., the stiffness of polyester fibers [DACRON and KODEL] ranges from 11 to 21 g.p.d., the stiffness of acrilan fibers [ORLON] amounts to about 10 g.p.d., while the stiffness of viscose rayon amounts to about 0.2 g.p.d. Similarly, the breaking elongation of a glass fiber is about 3—4 percent; while the breaking elongation of (a) polyester fibers ranges from 19—30 percent, (b) nylon fibers ranges from 25—40 percent, (c) acrilan is 25 percent, and (d) viscose rayon is 15—30 percent. By way of further example, glass fibers have a specific gravity of 2.54 whereas nylon and acrilan is about 1.14, rayon is about 1.46, and polyesters [DACRON and KODEL] are 1.22 and 1.38, respectively. In toughness on a denier basis, glass with a value of 0.07 is considerably lower than nylon's value of 0.75, rayon's value of 0.19, polyester's value of 0.5 for DACRON and 0.37 for KODEL and acrilan's value for ORLON of 0.4.

From the preceding data, it can be seen that, with respect to a number of properties, fiber glass differs from the more conventional organic fibers by a factor of from 3 to 10 or more. Accordingly, any consideration of adopting fiber glass as a reinforcement for rubber, of necessity, must proceed with the realization that mere substitution of a glass fiber for organic fibers is not feasible. To the contrary, new and unique fiber glass, strand, yarn or cord configurations must be developed to accommodate the difference in properties. Also, for glass to be used as a reinforcement, new geometric relationships as between the glass and the rubber, e.g., novel spatial dispositions, must be developed, having in mind, of course, in all cases, the stresses to which the ultimate product is to be subjected.

It has additionally been found that when glass filaments in gathered-together cord form are embedded in a belt, the resulting belt product has essentially no ability to stretch. This has proven inconvenient in hand installation of the belts over the marginal peripheries of the pulley or sheave. The absence of any elongation can also be undesirable under certain load applications which are accompanied by variable load and/or attendant vibration.

With the foregoing general introduction, it may be stated as an object of the present invention to provide an industrial drive belt construction which includes an elongate longitudinally positioned spiral reinforcement of generally nonextensible character but so combined and located interiorally within the belt as to lend thereto a pseudoelongation capability.

It is a particular object of the present invention to provide an industrial belt formed of flexible rubberlike material and containing a continuous nonextensible reinforcement composed of a plurality of subassemblies of glass; said reinforcement being embedded in a cushionlike sheath.

It is also an object of the present invention to provide a belt construction as described wherein the reinforcement in composed of a plurality of continuous subassemblies; each of which is embedded in a sheath formed of a material which is more resilient and cushionable than the body of the belt.

It is additionally an object of the present invention to provide a unique method of manufacturing an industrial belt featuring a continuous longitudinally spirally reinforced belt construction possessing an outer sheath or wrap selected to be of more resilient properties than the belt body proper.

It is still another object of the present invention to provide such a method as can be economically incorporated into existing industrial belt manufacturing techniques.

It is still another object of the present invention to provide a system of belt reinforcement which is capable of being carried out in a variety of ways.

It is yet another object of the present invention to provide an elongate cord assembly which is composed of a plurality of subassemblies and includes a surrounding sheath capable of expanding into a cellular body of less density than before.

The foregoing, as well as other objects of the present invention, will become apparent to those skilled in the art from the following detailed description taken in conjunction with the annexed sheets of drawings on which there are presented, for purposes of illustration only, several embodiments of the present invention together with several embodiments by which the method of the present invention may be carried out.

IN THE DRAWINGS

FIG. 1 is a partially perspective view of a V-belt mounted on a pair of spaced sheaves, one of which would be connected to a motor or engine (not shown) as representative of a typical application;

FIG. 2 is a vertical sectional view of the belt shown in FIG. 1, shown greatly enlarged to show the reinforcement cord;

FIG. 3 is an enlarged view of the reinforcement cord shown sectionally in FIG. 2;

FIG. 4 is an enlarged view of one of the three reinforcing elements making up the overall reinforcement cord;

FIG. 7 is a side elevation view, partially in section and partially in diagrammatic form, illustrating one technique for processing glass subelements as to produce a final assembly as to form a glass reinforcement element in accordance with the present invention;

FIG. 10 is a vertical sectional view of another belt embodying a variant feature of construction in accordance with the present invention.

Figure 5:
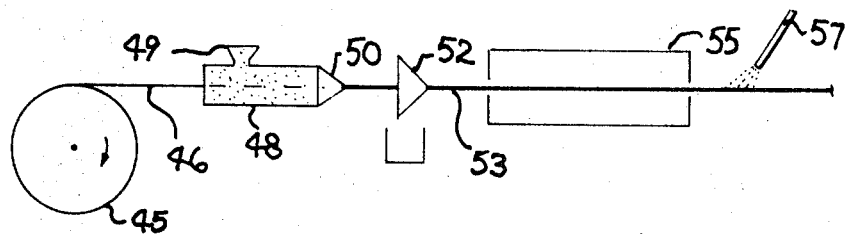
FIG. 5 is a schematic side elevation view illustrating one step in the formation of a reinforcing element for industrial belts in accordance with the present invention.

While the present invention envisions drive belts, conveyor belts and other industrial belts broadly, it will be described hereinafter with reference to V-belts.

As viewed most basically, the industrial belt of the present invention is inclusive of a construction featuring a continuous, elongated reinforcement member formed of a relatively nonextensible material; said reinforcement member being located interiorally and longitudinally of the belt proceeding in continuous spiral wraps from one lateral edge of the belt to the other and the elongate reinforcement being essentially embedded in a matrix or sheath which is more resilient or cushionable than the principal body portion of the belt.

The particular nature of the present invention will become more apparent from a detailed examination of the drawings in which in FIG. 1 the reference numeral 11 identifies the elongated belt mounted upon spaced sheaves or pulleys 13 and 15 and specifically in the grooves 17 thereof which are matched to the cross-sectional configuration of the belt as broken away at 19. Only the V-shaped grooves 17 of pulley 13 is shown by reason of the angle from which the perspective of FIG. 1 is presented. The pulleys, at any rate, are mounted to rotate about their respective axis 15a and 13a. The belt 11 is shown greatly enlarged in FIG. 2 and, as can be seen, is composed of an outer covering 21, a principal rubber body portion 23 and a continuous elongated reinforcement member 25 which proceeds in repeated spiral wraps from the lateral edge 27 to the lateral edge 29.

The resilient and cushionlike matrix or sheath is conveniently formed in accordance with the present invention by applying, onto the reinforcement member, a coating of an elastomer or of a plastic formulated to contain a substance or combination of substances which is operable to expand the applied coating on exposure to a suitable stimulus as, for example, heat encountered during vulcanization. The substance may be, for example, a blowing agent or the like, as discussed in more detail hereinafter. The spirally disposed reinforcement 25 is located closer to the upper face 30 of the belt than the lower face 32. The entire belt is encased in the friction-coated covering 21.

The reinforcement member 25 is shown greatly enlarged in FIG. 3. It is composed of three yarns 33, 33a and 33b of identical construction, which are combined together with a slight amount of twist. The yarns 33 are surrounded by a resilient and flexible cushionlike matrix 35 which, as shown, contains a plurality of cells or pores 37. The yarns 33, 33a and 33b, as shown in FIG. 4, are each formed of a plurality (10 in the drawings) of strands 40 combined together in a gathered-together assembly and each strand in turn being formed of a large plurality of individual continuous glass fibers or filaments. The strands 40 and, as well, the yarns 33 may be combined together with a slight amount of twist in a manner to be described. The individual strands 40 are ideally separated one from the other by a combination size and impregnant as will be described. The impregnant component is identified by the reference numeral 41.

Referring now to FIG. 5, there is shown in schematic array an apparatus setup adapted to coat the yarns 33, or a preformed assembly of the three yarns 33, 33a and 33b, with a material as would yield the cushiony matrix 35. A spool 45 contains an endless supply of either an individual yarn or a gathered-together array of yarns 33, 33a and 33b. This assembly is identified by the reference numeral 46 and it is in turn fed through an extruding apparatus 48 having an internal screw arrangement for mixing a supply of rubber stock material fed via the hopper 49 and applying it onto the yarn as it passes through the converging throat portion 50 to emerge as a coated yarn or coated yarn assembly. The coated yarn assembly passes through a wiping die 52 which controls the thickness of the extruded rubber stock onto the yarn or assembly of yarns. The yarn 53 bearing the proper amount of rubber stock is then passed through a mild warm air heating oven to partially set the coating of extrudate. A nozzle 57 serves to apply a spray or mist of a nontactifying agent, whereupon the coated yarn proceeds to a windup drum or directly to the V-belt manufacturing operation.

Figure 6:
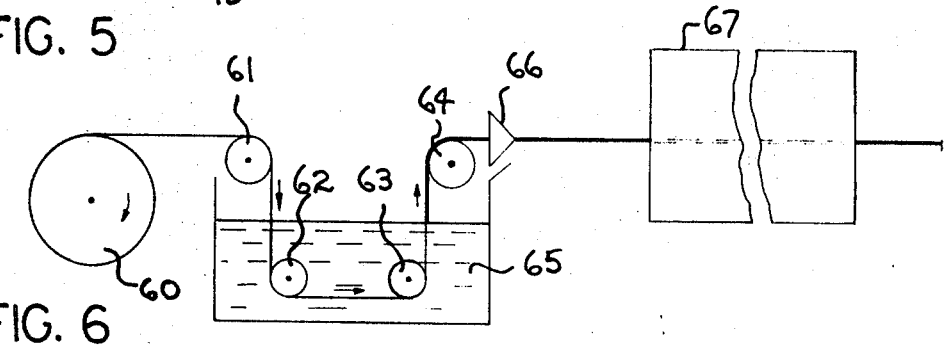
FIG. 6 is a schematic side elevation view illustrating an alternative step in the formation of a reinforcing element in accordance with the present invention.

FIG. 6 discloses an alternative technique for applying the coating, which forms the cushiony matrix 35, to the yarns 33 either individually or as a preassembled combination composed of yarns 33, 33a and 33b. In either case, the yarn or yarns are contained on a supply spool 60 from which they are unreeled to pass about rollers 61, 62, 63 and 64 in spaced array arranged to direct the yarn downwardly beneath the surface of a bath 65 composed of a latex emulsion of appropriate composition. After passing over the pulley 64, the yarn or yarns passes through a wiping die 66 from which excess latex is removed and from which the coated yarn emerges to pass into a mild hot air oven 67 which converts the latex coating to a relatively nontacky state so that it can be wound upon itself on a suitable windup roller, not shown. The viscosity of the latex emulsion 65 can, of course, be controlled to thereby affect the amount thereof picked up by the yarn, or by the twisted-together assembly of yarns. Generally, of course, the greater the viscosity, the larger the amount of the solids that will be picked up. The orifice of the wiping die 66 can, of course, also be adjusted. It will be appreciated that the impregnation technique of FIG. 5 and the immersion pickup technique illustrated in FIG. 6 are only representative of a number of ways in which the yarn or yarns can be coated with an elastomeric composition containing a suitable blowing agent or otherwise formulated as to possess the ability to expand to a spongy or cushionlike state when the ultimate belt is formed during vulcanization.

The combining of the individual yarns into a cord assembly may be accomplished utilizing commercially available twister apparatus. One type of twister apparatus is known as a "-Haskell-Dawes Twister." The latter is disclosed partially in schematic form in FIG. 7. This view is, for the most part, a front elevation view with part of the apparatus sectioned for clarity of illustration.

As shown in the drawings, three freely rotatable spools 150, 151 and 152 serve as a supply reservoir for continuous lengths of five-strand yarn assemblies 132 which are simultaneously drawn about a roller 153, through an aligning comb 154, over roller 155, under roller 156 and through a plate 157 containing three spaced orifices. The three yarns then pass into the twister apparatus 160 mounted on a standard 162. An upstanding frame 163 supports a rotatable hub 164 having arm extremities 165 and 166 extending oppositely. The arms 165 and 166 each bear normally projecting fingers 168 and 169. Finger 169 is a weight counterbalance for the finger 168. A pair of spools 172 and 174 are attached to the hub 164 and the one-arm extension 165. A support bracket 175 extends normally from the hub 164 and bears at its extremity a roller 176. Finger 168 bears rollers 184 and 186 at its end extremities, as shown. The hub 164 is rotated by geared wheels 177 and 178; the latter being connected to an electric motor 179 controlled by a rheostat 180 for controlling the rate of revolutions of the hub 164 and the fingers 168 and 169. The three strands passing from the orificaed plate 157 pass horizontally through a central passageway 182 in the hub about roller 176 and then in turn are entrained repeatedly about rollers 172 and 174 from which the three yarns emerge to pass over rollers 184 and 186 mounted rotatably on finger 168. The three-yarn assembly is then wound upon flanged spool 188 which is mounted for reciprocal to-and-fro movement in the direction indicated by the arrows 189. The rotation of the hub causes the finger element 168 (counterbalanced by finger 169) to rotate about the axis of the hub 200 which causes the three-yarn assembly to become simultaneously twisted together and wrapped about the core of the spool 188, as shown. The rotation of the hub and the finger 168 about the spool 188 causes the three yarns to be twisted into a cord assembly. The number of twists is controlled by the rotation of the hub. The foregoing twisting operation forms no part of the present invention, but the description is included in the interest of a full disclosure of the method of producing the novel glass cord reinforcement construction in accordance with the present invention. The reference numeral 134 identifies the side-by-side cords (which have been formed in the twisting operation) residing on the core of the spool 188.

To recapitulate for purposes of tying the several figures together, it should be appreciated that the yarn 132 corresponds to the 10 yarn assembly 33; each of the individual strands 40 being composed of a large plurality, e.g., 204, 408, or more, of individual filaments. Furthermore, the yarn 132, in addition, bears a coating imparted either in accordance with the technique of FIG. 5 or FIG. 6. The final cord 134 wound on the spool 188 will be composed of three of these combined together with twists. The three, of course, are, as described, drawn from the individual spools 150, 151 and 152. When ultimately combined into a V-belt in the manner to be described, and then exposed to vulcanizing conditions, the coating will expand to form the matrix of cushionable character and having the configuration as shown somewhat schematically in FIG. 3, while at the same time the belt will appear generally as in FIG. 2.

Figure 8:
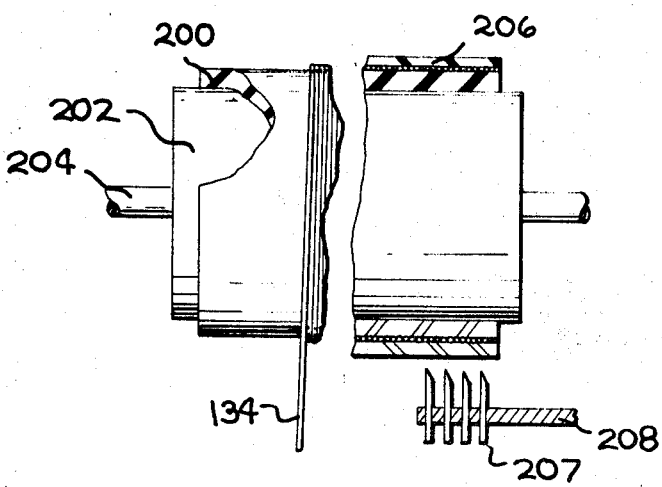
FIG. 8 is a vertical sectional view of an apparatus setup used in the manufacture of light-duty fractional horsepower belting incorporating a reinforcement element in accordance with the present invention.

The incorporation of the coated yarn 134 into the V-belt is disclosed in a very general way in FIG. 8. The left-hand portion of FIG. 8 shows the application of the cord reinforcement, while the right-hand portion of FIG. 8 shows a completed assembly about to be cut into individual endless loops. The first step in the manufacture involves a wrapping of a rectangular sheet of vulcanizable rubber stock 200 onto a collapsible drum 202 having a central rotatable shaft 204 driven in a suitable fashion not shown. After the rectangular piece of stock has been wrapped securely about the drum and its mating edges knitted together, the reinforcement cord 134 is applied by simply feeding it in on top of the layer of vulcanizable stock 200 while rotating the shaft 204 and, consequently, the drum 202. The cord is moved gradually to the left as successive wraps are applied and the spacing is maintained uniformly from edge to edge. While the successive winds of cord are shown spaced apart, it will be appreciated that they are usually located quite close together. When the spiral wrap has proceeded completely from one edge to the other edge of the stock, the cord is cut and pressed into the stock. A solvent is usually applied both before and after the cord is wound to improve securement and formation of an integral belt. Then a second somewhat thinner layer 206 (right-hand segment of FIG. 8) is wrapped about the reinforcement coextensively with the layer 200. The mating edges are then stitched together with a knurled tool as before, usually preceded by the application of a suitable solvent to improve the knitting together. Thereafter, a plurality of knives 207 mounted in an arm 208 are appropriately urged against the assembly on the drum to sever the multilayered assembly into a plurality of annular beltlike members. In some cases, the knives in pairs are inclined slightly towards each other to yield an annular loop or belt which more closely approximates the V-belt cross sectional configuration, e.g., a trapezoid. Thereafter, the drum is collapsed and the individual belt members are removed for further processing, specifically molding.

Figure 9:
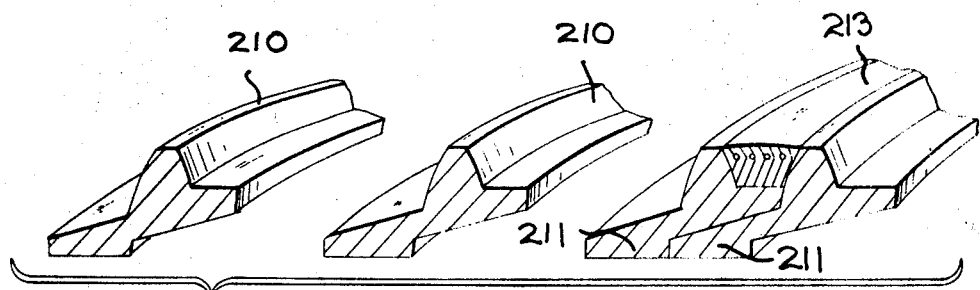
FIG. 9 is a perspective view showing segments of circular ring molds in an open position and in a closed position for forming the V-belts in accordance with conventional practice.

The molding operation is schematically illustrated in FIG. 9. A plurality of belts are molded at one time in a metal ring mold composed of a plurality of like configurated annular segments 210. Two of these segments are shown in spaced apart relationship on the left in FIG. 9, while on the right in FIG. 9 the segments now identified by the reference numeral 211 are in mating engagement to define therebetween a cavity for the uncured belt 213. When a plurality of belts have been located in the number of cavities as determined by the size and the number of elements making up the ring mold, the assembly is wrapped with a nylon sheeting a number of times to create, in effect, an outer restraining wall confining the rubber during the curing. The curing is conducted in an autoclave maintained at an appropriate temperature for the curing system and rubber stock employed.

Reference is now directed to FIG. 10 wherein is schematically illustrated a variant embodiment of the improved constructional features envisioned by the present invention. Therein disclosed is a V-belt 225 shown in section to reveal the interior structure. The principal reinforcement is a continuous cord reinforcement 227 which extends longitudinally of the belt and in repeated spiral winds from one lateral edge 228 to the other lateral edge 229 of the belt. In accordance with the present invention, the reinforcement cord 227 is positioned just above a layer 230 of elastomeric sheet material. This layer is formulated to contain a blowing agent which creates, upon suitable activation by suitable stimulus, a plurality of internal cells as lend to the layer a more resilient spongelike or cushionlike property. This layer may, of course, be fabricated to any given thickness and to any given degree of resilience as to provide the degree of pseudoelongation desired. Thus, it will be appreciated that the spiral cord will, by reason of the spongy or cushion layer, be allowed to deflect downwardly whereby the entire belt will, in effect, elongate. Reference numeral 232 identifies a second layer of elastomeric material which is formulated usually by fiber loading as to have a modulus, e.g., a stiffness, which is somewhat greater than the belt proper. This layer 232 thus serves as a support platform for the cushion or spongy layer 230. The combination of the cushion band 230 and the supporting platform band 232 tends to insure that the inward deflection of the glass cord will occur in a more uniform or unitized manner. Ideally, the layer 232 is formulated to contain a proportion of chopped glass fibers and a proportion of chopped glass cords. This provides the necessary increase in modulus, creating the somewhat stiff supporting platform, but avoids the decrease in elasticity or bounce as is normally associated with the increase in modulus imparted to rubber stocks by the inclusion of organic fiber loading. These latter have the attribute of attracting and absorbing the plasticizing components (natural and those added) in the rubber which impart elasticity and bounce to the rubber stock whereby the stock, in addition to the expected increase in modulus, usually demonstrates a certain deadness. Glass fiber and cord loading, on the other hand, does not have the tendency to attract these softening and plasticizing components of the rubber stock and consequently the resulting cured rubber exhibits the increase in modulus, e.g., stiffness or toughness, but without the usual attendant deadness.

Due to the fact that the individual glass fiber surface is inherently glassy, impervious, inert and slippery in contrast to the organic textiles, it is most desirable to treat the surface with a size or a liquid composition containing an anchoring agent. A number of suitable systems are the subject matter of patent applications assigned to the assignee of the present application. These are usually applied as a spray or a mist as the individual fibers are drawn from the forming bushing in attenuated form and just prior to the gathering together of the individual filaments into assembled strand formation. One suitable formulation is listed in Table 1.

TABLE 1

0.5–2.0 percent by weight gamma-aminopropyltriethoxy silane
0.3–0.6 percent by weight glycerine
Remainder water The size is allowed to simply dry in ambient air. Usually, the solids content is controlled to range from 0.25 to 3 percent by weight. The amount applied to the surface of the glass is sufficient to provide 0.5 to about 1 percent by weight.

The strand assemblies, in accordance with one embodiment of the present invention, are passed through an impregnating bath having a formulation in accordance with table 2 below.

TABLE 2

40–80 parts by weight Lotol 5440—U.S. Rubber Company Lotol 5440 is a 38 percent dispersed solids system including a butadiene-styrene-vinyl pyridine terpolymer latex, a butadiene styrene latex and a resorcinol-formaldehyde resin.
60–20 parts by weight water Impregnation of the foregoing yarn assembly is achieved by passing the yarn assembly through the liquid bath. A higher degree of impregnation or penetration into the interstitial voids is improved by subjecting the yarn to some distortion while within the bath proper. This can be accomplished by passing the continuously moving yarn to a change in direction as about a post, mandrel or pulley maintained in submersed relationship within the bath. The impregnated yarn is then desirably passed through a wiping die to remove excess impregnant and subjected to a temperature of 150°–350° F. to remove the diluent and "set" the solid firmly in the interstitial voids. Table 3 hereinbelow gives a formulation of another impregnant composition.

TABLE 3

100 parts by weight neoprene rubber
4 parts by weight powdered magnesium oxide
5 parts by weight powdered zinc oxide
15 parts by weight Channel Black
1 part by weight Thiate B (trialkyl thiourea accelerator)

The foregoing ingredients are mixed on the mill, sheeted off and dissolved in a suitable rubber solvent such as xylene or methyl ethyl ketone to form a 20 percent solids solution which constitutes the impregnating bath.

It will be appreciated that the selection of particular impregnant will be governed by the nature of the rubber stock material in which the impregnated "cord" or "bundle" is to be embedded in the several methods disclosed herein. Generally, it is desired that the impregnated yarn be composed of from 75–95 percent glass and 5–25 percent impregnant.

In accordance with another embodiment of the present invention, the impregnant composition as identified in the previous tables 2 and 3 are modified by the inclusion therein of a blowing agent. The technology of blowing agents, of course, is fairly well developed. Among the most common that have been used for a number of years are included ammonium sulfite, ammonium carbonate, sodium bicarbonate, azodicarbonamide and similar materials. Hydrazine including the hydrate and other hydrazine salts are extremely efficacious blowing agents. Reference may be had to U.S. Pat. No. 2,621,161 for a full disclosure of the use of various hydrazine derivatives as blowing agents for a variety of rubber formulations ranging from natural rubber to the synthetics, such as the butadiene styrene copolymers known as GRS, butadiene acrylonitrile polymers known as Buna N, butyl and polychloroprene as well as a variety of synthetics, e.g., plastics such as polyvinyl chloride, polyvinylidene chloride, cellulose esters, polystyrene, alkyd resins, urea formaldehyde resins, etc. Within the broad field of blowing agents are included, of course, that type which are compounds which in and of themselves decompose and evolve gas under the influence of certain effects such as, for instance, heat. There are also chemicals which react with other chemicals to produce a gas.

Under certain circumstances, synthetics may be used to form the coating or sheath about the strand or strand assemblies used as the reinforcement for V-belts in accordance with the present invention. Generally, the more rubberlike synthetic resin plastic materials are naturally preferred. These include polyvinyl chloride, polyvinylidene chloride, etc. Most preferably, of course, the coating or sheath destined for expansion to form the cushiony matrix surrounding the inextensible cord or strand formed of the assembled-together glass filaments is formed of an elastomeric material which is compatible with the elastomer of which the belt is formed. The technology of matching together compatible elastomer compounds and materials is, of course, well known and understood in the rubber art and need not be gone into in detail herein.

It should be appreciated that it will be most desirable under certain circumstances to have the expandable elastomeric composition activated by temperature or such other stimulus as will activate the expanding (blowing) agent, prior to vulcanization. Thus, the coated cord can first be heated to cause expansion followed by incorporating the cushion surrounded reinforcement member into the belt manufacturing operation. Usually where the blowing agent is strong enough and the twist employed in combining strands is not too rigorous, that is, not more than three or so, the preexpansion will not be necessary whereby expansion can proceed to activation during cure (vulcanization) as described hereinbefore.

Where separation of the subassemblies making up the reinforcement cord is of prime importance, it is desirable to expand the expandable coating surrounding each of the subassemblies prior to incorporation of the reinforcement into the belt and, in some instances, prior to twisting combinations of similarly coated subassemblies into cord configuration. Thus, the twisting operation itself tends to serve as a restraint against maximum separation of the subassemblies as schematically illustrated in FIG. 3.

V-belts incorporating as a reinforcement a glass cord composed of a three-yarn assembly, as illustrated in the drawings, are constructed in the manner described hereinabove. Each yarn is formed of 10 - strands preliminarily assembled together with a slight amount of twist. Each of the ten strands is formed of 408 individual filaments, bearing a size according to table 1. The cord bears a coating according to table 2 but modified to include, as a blowing agent, dihydrazine oxalate. The latter blowing agent provides an expansion of the coating to about twice the original volume of applied coating. V-belts, in accordance with the foregoing, exhibit long life under load and are possessed of a degree of elongation as to improve the ease of installation on spaced pulleys.

As indicated earlier herein, the ultimate cord reinforcement, for example, a 10/3 construction as described just above, or a 5/4 construction, may be coated with the blowing agent-containing elastomeric stock in the ultimate 10/3 cord form. Most preferably, however, the individual 10- subassemblies are treated individually and then three of these 10- subassemblies combined with a slight amount of twist, say 1½ twists per inch or 2½ twists per inch, to yield the ultimate reinforcing cord. This has the advantage that the three 10-strand units are, during the release of the blowing agent during vulcanization, urged into slightly more spaced relationship, as indicated somewhat schematically in FIG. 3. This tends to increase the overall belt life and additionally, tends to give the belt a more natural feel approaching that of an organic textile cord reinforced belt.

EXAMPLE I

A 10/3 cord 10 408-filament strands combined with a slight amount of twist followed by a combining together of three of the 10-strand assemblies) was prepared in which the individual filaments were coated with a size in accordance with table 1. The 10-strand assemblies were impregnated in an impregnant bath in accordance with the formulation of table 4. The 10-strand assembly was then coated with a rubber formulation as follows:

TABLE 4

| | |
|---|---|
| #1 Ribbed Smoked Sheet | 30 |
| SBR 1500 | 70 |
| Stearic Acid | 2 |
| Zinc Oxide | 5 |
| Agerite Resin D | 1 |
| Thermoflex A | 1.5 |
| SRF Black | 50 |
| MT Black | 30 |
| Sun 04240 Oil | 10 |
| Opex 100 (a) | 2 |
| RIA NC (b) | 0.5 |
| Santocure | 2 |
| Sulfur | 2 |
| | 206.0 |

(a) nitrogen releasing blowing agent-dinitrosopentamethylenetetramine-100 percent active ingredient
(b) surface treated urea Three of the coated strands, after being treated with a nontactifying agent, were combined together into a cord featuring, in the twisting assembly thereof, 2.5 twists per inch. The foregoing cord reinforcement was incorporated into a V-belt in which the body portion was formed of an SBR/natural rubber blend having the formulation in table 5 below.

TABLE 5

| | | Parts |
|---|---|---|
| #1 Ribbed Smoked Sheet—Prebroken | | 30 |
| SBR 1500 | | 70 |
| Zinc Oxide | | 3 |
| AgeRite Resin D | | 3 |
| Santocure | | 2 |
| SRF Black | | 100 |
| Sulfur | | 2 |
| Stearic Acid | | 1 |
| Circo Oil—Light | | 5 |
| ¼ inch Chopped Cotton Fibers | | 6 |
| | | 222 |
| Tensile | | 1,935 |
| Elongation | | 190 percent |
| Modulus @ | 50% | 770 |
| Modulus @ | 100% | 1,095 |
| Durometer | | 85 |

Examination of the vulcanized belts, when cut, revealed in section a definite spongy or cushiony sheath surrounding the three principal strands. This cushiony sheath surrounding the cords as embedded in the belt proper permitted the cord to exhibit a pseudoelongation or stretch capability when the belt was mounted upon a pair of spaced pulleys.

Modifications may be resorted to without departing from the spirit and scope of the present invention as defined in the appended claims.

We claim:

1. The method of manufacturing an industrial belt which comprises:
    coating an elongate relatively inextensible reinforcement member with a rubberlike composition containing any substance, including combinations of substances, operable to expand said rubberlike composition to a cushionable sheath when subjected to a stimulus-selected to activate said substance(s),
    wrapping a layer of elastomer about a core,
    winding a continuous length of said coated reinforcement about said layer of elastomer in side-by-side winds defining a repeating spiral,
    wrapping a second layer of elastomer about and coextensive with said first layer with the spiral reinforcement therebetween,
    cutting the thusly formed cylindrical assembly into a plurality of loops,
    removing said loops from said core,
    subjecting said rings to heat an will cure said elastomer and activate said substance(s), thereby expanding said rubberlike coating into a cushionable sheath.

2. The method as claimed in claim 1, wherein said reinforcement is an assembly of glass fibers.

3. The method as claimed in claim 2, wherein said fibers are continuous filaments.

4. The method as claimed in claim 1, wherein said reinforcement includes a plurality of yarns combined together with a slight amount of twist, said yarns each including a plurality of strands combined together with a slight amount of twist, said strands each including a plurality of continuous glass filaments combined together with a slight amount of twist.

5. The method as claimed in claim 4, wherein said yarns are coated, with a rubberlike composition capable of expansion to a cushionable state, prior to being combined into said reinforcement.

6. The method of manufacturing an industrial belt of annular configuration which comprises:
    wrapping a first layer of elastomer about a core,
    winding a continuous length of an elongate reinforcement member about said first layer of elastomer, repeated winds of said reinforcement lying in contiguous relationship, said elongate reinforcement member bearing a coating containing a material which is adapted to convert said coating to a cushionable sheath on exposure to heat,
    wrapping a second layer of elastomer about said first wrap and over said reinforcement,
    dividing said so-formed hollow elastomeric cylinder into a plurality of rings, and
    heat curing said rings into belt configuration to thereby expand said material to form said cushionable sheath.